United States Patent
Reynolds

[15] 3,660,977
[45] May 9, 1972

[54] EMERGENCY HYDRAULIC POWER SYSTEM

[72] Inventor: Richard W. Reynolds, Rockford, Ill.
[73] Assignee: Sundstrand Corporation
[22] Filed: Mar. 5, 1970
[21] Appl. No.: 16,841

[52] U.S. Cl.............................60/39.28, 60/39.14, 60/39.46, 60/250, 60/251
[51] Int. Cl. .........................................F02c 9/08, F02c 9/10
[58] Field of Search....................................60/39.28

[56] References Cited

UNITED STATES PATENTS

| | | | |
|---|---|---|---|
| 3,171,420 | 3/1965 | Cowles | 60/39.28 X |
| 3,269,703 | 8/1966 | Durdin | 415/122 |
| 3,064,421 | 11/1962 | Jurisch | 60/39.28 |
| 3,269,713 | 8/1966 | Beck | 261/41 |

FOREIGN PATENTS OR APPLICATIONS 723,241  2/1955  Great Britain.........................60/39.28

*Primary Examiner*—Clarence R. Gordon
*Attorney*—Hofgren, Wegner, Allen, Stellman & McCord

[57] ABSTRACT

An emergency hydraulic power system for providing emergency hydraulic supply to an aircraft including a turbine driving a variable displacement pump through a gear box with a speed control to maintain a substantially constant turbine speed consisting of a centrifugal fuel pump that is driven at turbine speed for supplying a monopropellant fuel to a decomposition chamber, a bistable fuel control valve in the outlet of the fuel pump that is operated by a fuel pressure responsive pilot valve that closes the normally open fuel control valve when outlet pressure from the fuel pump exceeds a predetermined value indicating turbine overspeed, and opens the fuel control valve when the outlet pressure from the fuel pump drops below a predetermined value indicating turbine underspeed.

10 Claims, 1 Drawing Figure

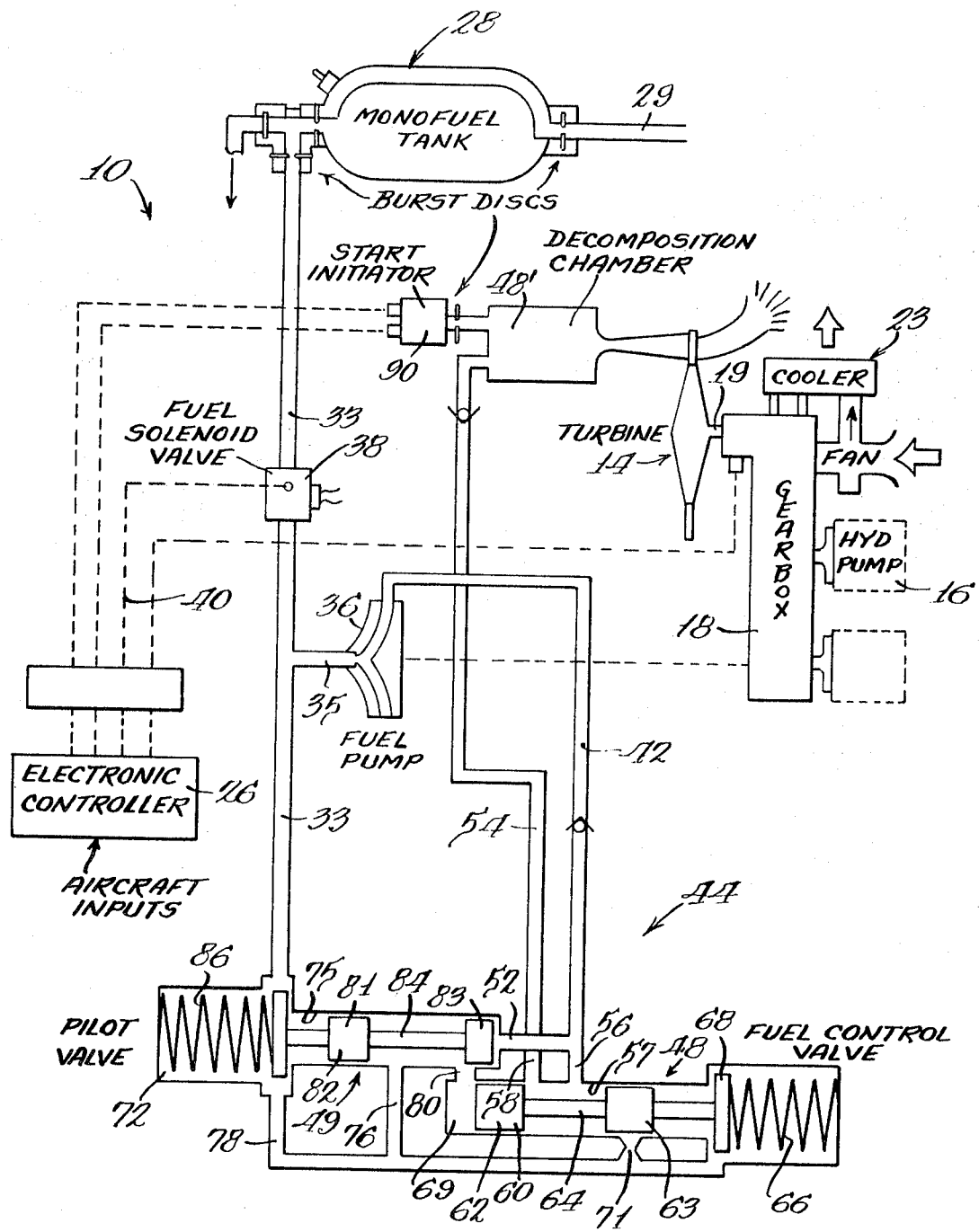

EMERGENCY HYDRAULIC POWER SYSTEM

BACKGROUND OF THE PRESENT INVENTION

Various types of emergency hydraulic power systems have been provided in the past for aircraft to supply hydraulic fluid to the aircraft's hydraulic system when the normal hydraulic power supply fails. Rotary turbines have also been provided for supplying various power sources to the associated aircraft, such as, for example, to provide power for starting the aircraft engine. One example of such a turbine is disclosed in the Durdin et al U.S. Pat. No. 3,269,703, assigned to the assignee of the present invention.

The present invention is directed primarily to the provision of a fuel control for the auxiliary or emergency power turbine which controls the fuel in a manner to maintain a substantially constant speed of the turbine. While various constant speed controls have been provided in the past for turbines, such as rotary turbine driven governors, these prior controls have been expensive in construction, unreliable to the extent of their multiplicity of parts, and sometimes slow responding.

It is a primary object of the present invention to provide a new and improved fuel control for an auxiliary hydraulic power turbine in an emergency hydraulic power system that is uncomplicated, has a rapid response, and maintains turbine speed very close to the steady state design speed.

SUMMARY OF THE PRESENT INVENTION

In accordance with the present invention, an auxiliary hydraulic power supply is provided for an aircraft to provide emergency hydraulic fluid thereto when the primary hydraulic supply system fails, consisting of a turbine which drives the hydraulic pump, with a turbine decomposition chamber being supplied monopropellant fuel from a centrifugal pump directly driven by the turbine. The centrifugal pump is connected to supply fluid to a decomposition chamber which is preheated to assist in bringing the turbine up to speed.

A fuel control valve is provided in the line between the outlet of the fuel pump and the inlet of the decomposition chamber for the purpose of controlling the flow of fluid to the decomposition chamber. The fuel control valve as shown is bistable and is either fully open or fully closed. A proportional valve may be used, but there are some advantages with a bistable valve. Thus the fuel control valve acts in a manner to provide pulsating fuel flow to the decomposition chamber.

To effect this bistable operation a spring biased pilot valve is provided for shifting the fuel control valve from its open position to its closed position, and to permit the fuel control valve to return to its open position. The pilot valve is a spring biased valve that responds to the outlet fluid pressure of the fuel from the centrifugal fuel pump. Since the outlet pressure of the fuel pump is proportional to the square of the speed, and since the fuel pump is driven directly by the turbine, the outlet pressure of the pump is representative of turbine speed. The sensitivity of the pilot valve is such that when a predetermined fuel pump outlet pressure is applied thereto indicating a predetermined turbine overspeed the pilot valve will shift the fuel control valve to a closed position shutting off the fuel supplied to the decomposition chamber. With the turbine operating below design speed the fuel pump discharge pressure is insufficient to overcome the normally closed pilot valve spring force and the fuel control valve is permitted to open to its normal position passing fuel to the decomposition chamber.

When the fuel control valve closes to shut off the fuel supply the pump, flow is ported through a restricted orifice, through a pilot valve spring cavity associated with the pilot valve, and back to the pump inlet. This orifice is sized to reduce fuel pressure in the return line to the pump inlet pressure. With the fuel supplied to the decomposition chamber shut off, the turbine speed decreases rapidly depending upon the load on the turbine gear box, to a point at which the pump pressure is insufficient to hold the pilot valve in a position maintaining the fuel control valve closed. The control valve thus has a snap open and snap close action in controlling flow to the decomposition chamber.

This speed control has the capability of maintaining the turbine speed within a range of plus or minus five percent of its steady state speed. There may, however, be some variation in the steady state speed from the design speed due to fuel density variation, spring modulus variation, and variation in valve friction, but this should not exceed three percent.

It should be understood that the illustrated fuel flow control is an on-off control and the cycle rate of this "bang-bang" action of the speed control valve varies as the load on the turbine varies. Thus at a high load condition, turbine acceleration with rated fuel flow is slow while deceleration occurs very rapidly when fuel flow is stopped. This causes the fuel flow control valve to stay "on" or open for long periods and to remain "off" or closed for short periods. At low load conditions the opposite happens with acceleration occurring rapidly and deceleration occurring slowly so that the "off" periods of the flow control valve are somewhat longer and the "on" periods are shorter, however the cycle rate of the flow control valve increases under the low load condition. Maximum frequency occurs when the on-time and the offtime are approximately equal.

BRIEF DESCRIPTION OF THE DRAWINGS

The drawing is a schematic illustration of the present emergency hydraulic power supply employing a turbine as the prime mover.

DETAILED DESCRIPTION OF THE PREFERRED EMBODIMENT

Referring to the drawing an emergency hydraulic power unit 10 is provided for aircraft that upon a failure of the main hydraulic supply system may be activated by the pilot to provide a source of hydraulic fluid until the main hydraulic power supply problem can be corrected or the aircraft landed.

The emergency power unit 10 consists principally of a turbine 14 which drives a variable displacement pump 16 through a gear box 18. The turbine 14 is preferably an axial flow impulse type turbine having an output shaft 19 driving the gear box 18. The gear box 18 includes a one way clutch to prevent the application of reverse torque to turbine 14. The hydraulic pump 16 may include suitable pressure compensating controls (not shown) for maintaining a substantially constant outlet pressure. The pump 16 may take the form of a conventional variable displacement axial piston hydraulic unit. Gear box 18 is constructed to act in a reducing fashion to decrease the output speed from the high speed of shaft 19, e.g. 100,000 rpm, to for example, 3,000 rpm.

A suitable cooler such as shown at 23 is provided for cooling the gear box 18. The cooler includes a fan driven by the gear box and is conventional in construction and forms no part of the present invention. An electronic controller 26 is provided, operable by cockpit inputs to activate the auxiliary hydraulic unit 10 by initiating the supply of fuel to the turbine and initiating fuel preheaters to assist in bringing the turbine up to speed.

A monopropellant fuel tank 28 is provided which is pressurized through conduit 29 by a suitable source. The fuel tank 28 is preferably hermetically sealed and pressurized at 350 psig, for example. One fuel found acceptable in the present system is monopropellant M-86, a commercially available fuel used by Olin Mathieson Chemical Corp.

Conduit 33 is provided for supplying fuel to conduit 35 and a fuel pump 36 across a fuel solenoid valve 38. The electronic controller 26 provides a signal through line 40 to the solenoid operated valve 38 to open the same upon activation of the auxiliary power unit. The pressure in conduit 35 is somewhat lower than the tank pressurization pressure, e.g. 350 psig.

The fuel pump 36 is a centrifugal pump of the type disclosed in the Nichols et al U.S. Pat. No. 3,162,135 assigned to the assignee of the present invention. Pump 36 is driven by gear box 18 at the same speed as the turbine shaft 19, through suitable gearing in the gear box. Alternatively, the pump 36 may be directly driven by the turbine shaft 19 by mounting the same on the opposite side of the gear box 18. The pump 36 inherently has the characteristic of providing outlet fluid pressure in conduit 42 proportional to the square of the speed of rotation of the pump. Thus the pressure in conduit 42 is representative of the speed of the turbine 14 and this parameter is employed in the fuel control valve circuit 44 to control the flow of fuel to a decomposition chamber 48'.

The fuel control valve circuit 44 consists of a bistable fuel control valve 48 operated by a pilot valve 49 in response to the outlet fluid pressure in conduit 42 acting through conduit 52.

Fuel control valve 48 is either fully opened or fully closed so that it cycles providing pulsating fuel flow to the decomposition chamber through conduit 54. Control valve 48 includes an inlet passage 56 opening to a valve bore 57 and communicating with an outlet port 58 when valve stem 60 is in the normally open position shown in the drawing. Valve stem 60 is seen to consist of lands 62 and 63 separated by a reduced stem portion 64. Valve 60 is biased to its open position by a spring 66 acting against an enlarged land 68 and biasing the entire valve member to the left against the force of fluid pressure in the left end of bore 57 defining chamber 69. An orifice outlet 71 in bore 57 communicates with return conduit 78.

The pilot valve 49 selectively pressurizes the chamber 69 and shifts the valve 60 to a position where land 62 blocks outlet 58 and inlet 56 communicates with the orifice outlet 71. Thus when the valve member 60 is in its closed position fuel supply from the pump is ported through the restricted orifice, through a spring cavity 72 associated with valve 49 and from there into conduits 33 and 35 back to the inlet of the fuel pump 36. The orifice 71 is sized to reduce fuel pressure in the return line to the pump inlet pressure, e.g. 300 psi. Flow through the orifice prevents overheating of the fuel when the valve 60 is in the closed position.

The pilot valve 49 includes a valve bore 75 communicating at one end with passage 52 which carries outlet fluid from the pump 36, a drain passage 76 communicating with return passage 78, and a control passage 80. Slidable in bore 75 is a valve stem 81 having lands 82 and 83 separated by a reduced stem portion 84. The right end of land 83 is biased by fuel pump outlet fluid pressure in line 52 against the opposing force of a spring 86 in spring cavity 72 biasing the pilot valve to a position where land 83 blocks communication between passage 52 and control port 80. It should be understood that the valve 81 is constructed so that in its rightmost position chamber 69 will be drained across reduced stem portion 84 and drain passage 76. Land 82 may have a longitudinal flat or groove to permit fluid flow on reciprocation.

The valve land 83 is sized with respect to the strength of spring 86 such that upon a predetermined pressure in line 52 (pump outlet pressure), e.g. 1,300 psi, the valve land 83 will open control port 80 to passage 52 permitting chamber 69 to fill, shifting the valve member 60 to its closed position. As noted above, the valve member 60 is either in its opened or closed position and delivers pulsating charges of fuel to the decomposition chamber 48'. To accomplish this, the valve land 83 opens at a predetermined pressure which represents a predetermined speed of turbine 14, and closes at a predetermined lower pressure representing underspeed. It may thus be seen that the pilot valve 49 cycles the control valve 48 between its opened and closed positions.

Phrased differently, the pilot valve 49 is constructed so that at fuel pressures corresponding to a turbine speed somewhat above the design speed, the pilot valve will shift the valve member 60 to its closed position blocking fuel flow. The speed of the turbine will then drop until the pressure in passage 52 falls to a value corresponding to a predetermined speed somewhat below design speed at which time the pilot valve will shift to its closed or right-most position draining chamber 69 and permitting spring 66 to shift the fuel control valve to its opened position shown, again delivering fuel to the decomposition chamber 48'. Thus the turbine sees a pulsed fuel flow. The fuel control valve 44 automatically matches the hydraulic flow demand of pump 16 by providing a high percentage of "on time" or open valve 48, with the high hydraulic load on pump 16, and a low percentage of "on time" with a reduced load on the pump. These valves vary the fuel consumption of the unit in proportion to load demand, and operation of the turbine 14 is maintained substantially at rated speed by providing a rapid response to significant load changes on pump 16.

In one exemplary construction, the following parameters were found acceptable for the pilot valve spool 81 and the control valve spool 60.

| Pilot Valve Spool | Control Valve Spool |
|---|---|
| Spool Diameter 0.125 inch | 0.187 inch |
| Actuation Force 11.07 lb. | 24.8 lb. |

The decomposition chamber 48' may be of thermoregenerative type with an operating pressure of, for example, 1000 psig. For the purpose of preheating the decomposition chamber 48' and assisting in bringing the turbine 14 up to speed, a start initiator 90, which is of the solid propellant type, heats the decomposition chamber 48' to initiate fuel decomposition. The initiator 90 is sized to burn out prior to the turbine 14 accelerating to its rated speed. Thus the unit reaches rated speed under control of the turbine speed control valve circuit 44 described above.

In operation, upon initiation of the emergency hydraulic power unit 10 through electronic controller 26, the controller 26 provides a signal pressurizing the monofuel tank 28 through passage 29 and opens the fuel solenoid valve 38. At the same time the start initiator 90 is ignited through controller 26 and preheats the decomposition chamber 48' which delivers hot combustion gases through supersonic nozzles to the blades of turbine 14. The fuel pump 36 then begins rotation delivering fluid through the normally open control valve 48 to the decomposition chamber 48'. The turbine then continues accelerating until the start initiator 90 burns out and thereafter the control is provided solely by the fuel control valve 48. After the design speed is exceeded, the pilot valve 49 shifts, snapping control valve 48 to its closed position and terminating the supply of fluid to the combustion chamber. The speed of turbine 14 then falls somewhat below the design value and at that predetermined speed the pressure in passage 52 is insufficient to hold the pilot valve open and it closes permitting the control valve 48 to snap to its open position.

It is thus seen that the control is a snap action valve control that cycles slowly under heavy loads and rapidly under light loads on the hydraulic unit 16. The "on time" of the valve is longer with a higher load than with a lower load since the pressure in conduit 52 decays more rapidly under heavy load.

While the operation has been described as an emergency power system, it should be understood that the system may be used as a primary source of hydraulic power in some installations, if desired.

I claim:

1. A turbine drive assembly, comprising: a rotary turbine, a source of fuel fluid for the turbine, pump means for delivering fuel to the turbine, said pump being drivingly connected to rotate at a speed proportional to the speed of the turbine, and means for maintaining a substantially constant turbine speed under varying load conditions including valve means for delivering fuel to the turbine, and pilot means responsive to fuel fluid from the pump means for adjusting the valve means to increase fuel flow to the turbine when the speed thereof drops below a predetermined value and for adjusting the valve means to decrease the fuel flow to the turbine when the speed thereof increases above a predetermined value.

2. A turbine drive assembly, comprising: a rotary turbine, a source of fuel fluid for the turbine, pump means for delivering fuel to the turbine, said pump being drivingly connected to rotate at a speed proportional to the speed of the turbine, means for maintaining a substantially constant turbine speed under varying load conditions including valve means responsive to fuel fluid from the pump means for increasing fuel flow to the turbine when the speed thereof drops below a predetermined value and for decreasing the fuel flow to the turbine when the speed thereof increases above a predetermined value, and a bistable fuel control valve, said bistable fuel control valve opening when the speed of the turbine drops below a predetermined value and closing when the speed of the turbine exceeds a predetermined value.

3. A turbine drive assembly, comprising: a rotary turbine, a source of fuel fluid for the turbine, pump means for delivering fuel to the turbine, said pump being drivingly connected to rotate at a speed proportional to the speed of the turbine, means for maintaining a substantially constant turbine speed under varying load conditions including valve means responsive to fuel fluid from the pump means for increasing fuel flow to the turbine when the speed thereof drops below a predetermined value and for decreasing the fuel flow to the turbine when the speed thereof increases above a predetermined value, a bistable fuel control valve for controlling the flow of fuel fluid from the pump means to the turbine, said fuel control valve being movable from an opened position to a closed position, a fluid pressure responsive pilot valve for shifting said fuel control valve from the opened position to the closed position, and means communicating outlet fuel fluid from said pump means to said pilot valve so that the pilot valve is responsive to the pressure of fuel fluid.

4. A turbine drive assembly as defined in claim 3, wherein said pilot valve is resiliently biased in opposition to fuel fluid pressure, said pilot valve being constructed to shift at a predetermined pressure against the biasing force thereon and direct fuel fluid pressure to the fuel control valve for moving the latter from the first position to the second position, said predetermined pressure being that pump means outlet pressure that corresponds substantially with the desired turbine speed.

5. A turbine drive assembly as defined in claim 3, wherein said pump means is constructed to provide outlet fuel fluid at a pressure proportional to the square of the turbine speed.

6. A turbine drive assembly as defined in claim 5, wherein said pump means is a centrifugal pump.

7. A turbine drive assembly as defined in claim 3, including resilient means biasing said fuel control valve to the open position so that fuel control valve is normally fully open to provide unobstructed fuel flow from the pump means to the turbine.

8. A turbine drive assembly as defined in claim 7, including spring means biasing said pilot valve to a position placing the control valve in the open position.

9. An emergency hydraulic power supply system for an aircraft, comprising: a rotary turbine, a reducing gear box driven by the turbine, a hydraulic pump driven by the gear box and adapted to supply hydraulic fluid to the aircraft's hydraulic system, a source of fuel for the turbine, control means for the source of fuel to maintain a substantially constant turbine speed including a fuel pump driven at a speed proportional to the turbine speed, passage means connecting the outlet of the fuel pump to the turbine, and fuel control valve means in said passage means, pilot means opening said valve means and porting fluid to the turbine when the pressure decreases below a predetermined value and for closing said valve means and terminating fuel flow to the turbine when the pressure increases above a predetermined value.

10. An emergency hydraulic power supply system for an aircraft, comprising: a rotary turbine, a reducing gear box driven by the turbine, a hydraulic pump driven by the gear box and adapted to supply hydraulic fluid to the aircraft's hydraulic system, a source of fuel for the turbine, control means for the source of fuel to maintain a substantially constant turbine speed including a fuel pump driven at a speed proportional to the turbine speed, passage means connecting the outlet of the fuel pump to the turbine, fuel control valve means in said passage means responsive to fuel fluid pressure from said fuel pump for opening and porting fluid to the turbine when the pressure decreases below a predetermined value and for closing and terminating fuel flow to the turbine when the pressure increases above a predetermined value, a decomposition chamber for porting fuel from said passage means and conveying hot decomposition gases to the turbine, said fuel source including a monopropellant fuel tank connected to deliver fuel to the fuel pump, and a pilot valve for controlling said fuel valve in bistable fashion, said pilot valve being biased in a first direction by a spring and biased in the opposite direction by outlet fluid pressure from the fuel pump, said pilot valve being constructed to shift said fuel control valve to a closed position when the pressure acting on the pilot valve exceeds a predetermined value corresponding substantially to that outlet pressure of the fuel pump which is produced at the desired turbine speed.

* * * * *